United States Patent [19]

Matuska et al.

[11] Patent Number: 4,874,292
[45] Date of Patent: Oct. 17, 1989

[54] APPARATUS FOR DAMPING HELICOPTER ROTOR BLADE OSCILLATIONS

[75] Inventors: David G. Matuska, Beacon Falls; Donald L. Ferris, Newtown, both of Conn.

[73] Assignee: The United States of America as represented by the Secretary of the Army, Washington, D.C.

[21] Appl. No.: 272,967

[22] Filed: Nov. 18, 1988

[51] Int. Cl.[4] ........................ B64C 27/33; B64C 27/38
[52] U.S. Cl. ................................ 416/140; 416/134 A
[58] Field of Search ............... 416/140 A, 141, 140 R, 416/138 A, 134 A

[56] References Cited

U.S. PATENT DOCUMENTS

| 3,261,407 | 7/1966 | Culver et al. | 416/140 A X |
|---|---|---|---|
| 3,310,119 | 3/1967 | Watson | 416/140 A X |
| 3,606,575 | 9/1971 | Lermusiaux | 416/138 A X |
| 4,111,605 | 9/1978 | Roman et al. | 416/138 A X |
| 4,182,597 | 1/1980 | Derschmidt | 416/134 A |
| 4,352,631 | 10/1982 | Buchs et al. | 416/134 A |
| 4,466,774 | 8/1984 | Cycon et al. | 416/138 A X |
| 4,645,423 | 2/1987 | Ferris et al. | 416/140 A |
| 4,650,401 | 3/1987 | Yao et al. | 416/140 A X |
| 4,676,720 | 6/1987 | Niwa et al. | 416/134 A |

FOREIGN PATENT DOCUMENTS

| 3148903 | 6/1983 | Fed. Rep. of Germany ... 416/140 A |
|---|---|---|
| 1442684 | 5/1966 | France ............................ 416/138 A |

Primary Examiner—Everette A. Powell, Jr.
Attorney, Agent, or Firm—Norman L. Wilson, Jr.

[57] ABSTRACT

A major design consideration in helicopters is that of compensating for stresses on blades resulting from air forces during blade revolutions. Spinning rotor blades are severely stressed. To some degree conventional articulated helicopter rotor hubs overcome vibration difficulties, but high maintenance is a problem. Hingeless helicopter rotor assemblies, generally employing composite materials, were developed to overcome these obstacles. Such hingeless helicopter rotor assemblies usually include a rigid central hub member, and radial flexbeams rigidly attached to the hub member. Flexbeam rotors do not completely eliminate the dynamic instability difficulty. Even using these designs energy must be absorbed by damping means. The shear principle of damping is utilized in this invention.

4 Claims, 1 Drawing Sheet

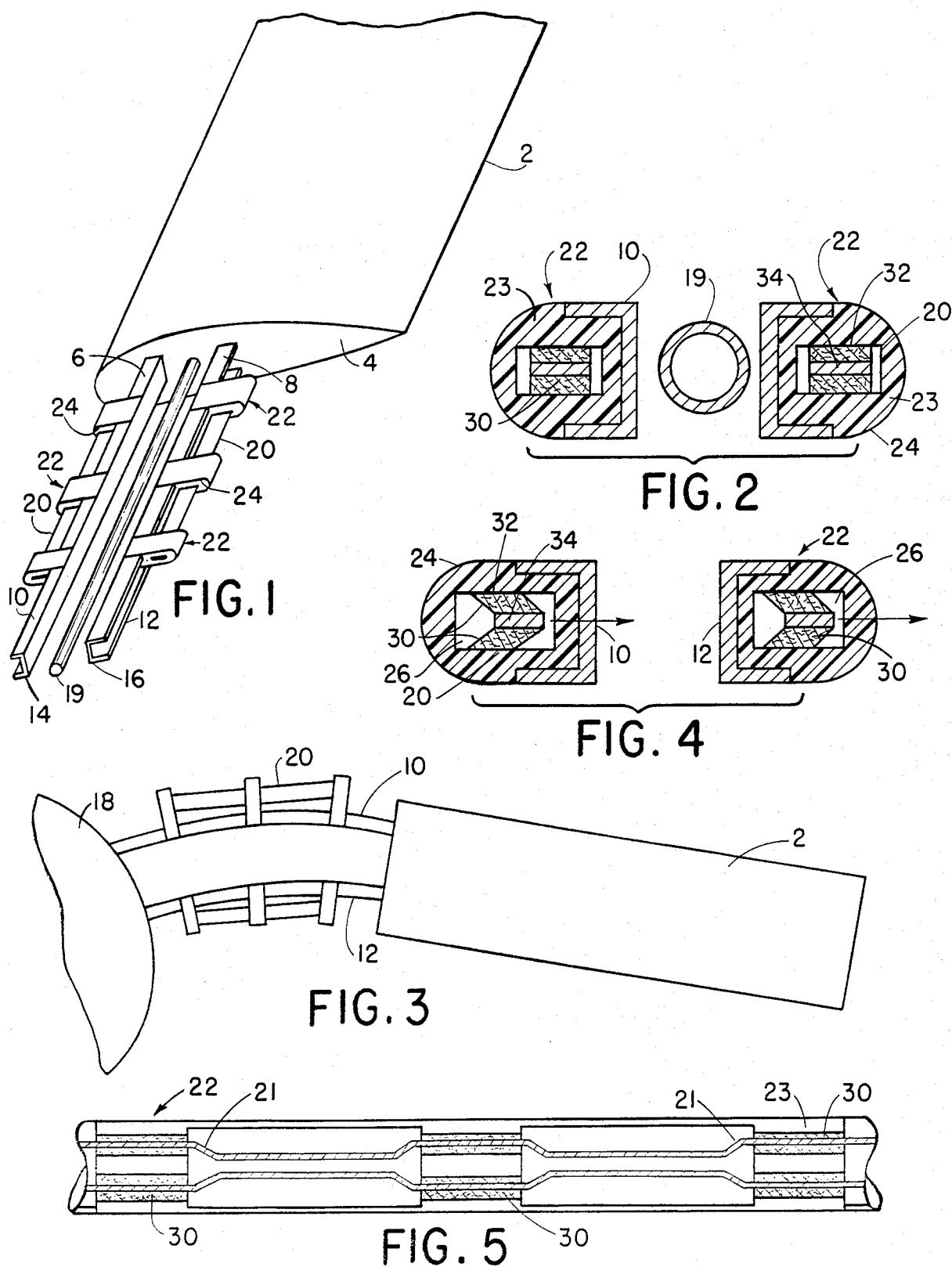

APPARATUS FOR DAMPING HELICOPTER ROTOR BLADE OSCILLATIONS

BACKGROUND OF THE INVENTION

A helicopter is a highly complex dynamic machine. As a consequence a major design consideration is the stresses on blades resulting from air forces during blade revolutions in forward flight, as well as Coriolis forces resulting from dynamic coupling of flapping and lead/-lag motion which act on each rotor blade throughout a revolution. Spinning rotor blades are so severely stressed that early on, materials could not be found which could tolerate those stresses. The rotating blades go through a variety of cyclic position changes due to external vibratory forces. There are also other vibratory forces associated with the rotor shaft motion when the helicopter is sitting on the ground and naturally rocking on its landing gear. In fact, these vibrations can become so severe they cannot be tolerated.

To some degree conventional articulated helicopter rotor hubs solve the vibration problem. They permit flapping motion of the blades, pitching movement of the blades, and lead/lag movement of the blades which relieves the vibratory bending moments into the hub, but this is accomplished at the expense of high hub weight since the hinges require lubrication and constant observation to detect wear and fatigue.

Hingeless helicopter rotor assemblies, generally employing composite materials, were developed to solve the weight and maintenance problems. They provide light weight helicopter hub assemblies. Such hingeless helicopter rotor assemblies usually include a rigid central hub member and radial flexible beams (flexbeams) rigidly attached by their root (inboard) ends to the hub. The blades are rigidly attached at their root ends to the outboard ends of the flexbeams.

Flexbeams can be in the form of C-beams, I-beams, T-beams, X-beams, and the like and one or more can be employed. A desirable flexbeam embodiment comprises two back-to-back C-beam members. The flexbeam is designed to bend in the vertical mode to accomodate blade flapping and in the horizontal mode to accomodate lead/lag motion of the blades. A rigid pitch shaft disposed between the two C-beam members transmits blade pitch-changing inputs from a control rod near the hub to the root end of the blade, and the flexbeams yield torsionally to permit the blade pitch changes. Flexbeams, thus, must be resilient in three orthogonal axes (pitch, lead/lag and flap). They are, of course, longitudinally rigid so that, by gimbal or other means, they transmit a blade centrifugal force to the central hub. Such a hingeless helicopter rotor with an elastic gimbal hub is illustrated in U.S. Pat. No. 4,323,332.

The use of hinged and flexbeam rotors does not completely eliminate the dynamic instability problem. Even using these designs energy must be absorbed. If damping means are not included, a self-excited vibration can cause the helicopter to vibrate with increasing amplitude, and the blades to move back and forth in the plane of rotation, but out of pattern. This phenomenon, known as ground resonance because it happens on the ground, must be prevented by damping.

The selection of the helicopter rotor damping means depends upon whether the rotor assembly is a hinge or hingeless type. A damping means for a hinge-type helicopter is exemplified in U.S. Pat. No. 2,554,774. Flexbeam rotor damping is described in U.S. Pat. No. 4,645,423. In the damping means described in that patent, damper assemblies are employed which include inboard and outboard housing units containing elastomeric damping layers. The damping layers deform in the shear mode, damping out the translatory input to the damper assembly. By the practice of the current invention, the shear principle is utilized without the weight and complexity of the linkages, housing units and long damper rods.

SUMMARY OF THE INVENTION

In accordance with this invention, means are provided for damping lead/lag rotor blade motion in a flexbeam-type helicopter, that is a helicopter having a rotor system characterized by a central hub, radial flexbeams attached at their root ends to the hub, and rotor blades attached at their root ends to the outboard ends of the flexbeams. The damping means of the invention includes a damper beam and a plurality of damper beam supporting yokes adjacent sections of the flexbeam. The damper beam supporting yoke has a longitudinal cavity therethrough. A damper beam passes through the cavity so that it lies substantially parallel to the flexbeam. Elastomeric shear pads are mounted on damper beam sections within the cavity. Bonding means bind one side of the shear pad to the damper beam and the other side to a cavity wall so that relative motion between the damper beam and the supporting yoke causes the damper pads to deform in the shear mode. Means are provided for anchoring the damper beam supporting yoke to its adjacent flexbeam section so that on lead/lag bending of the flexbeam, introducing said relative motion, the shearing action damps the flexbeam lead/lag motion.

BRIEF DESCRIPTION OF THE DRAWING

One advantage of this invention is that flexbeam rotor blade damping is accomplished without significantly inflexibilizing the rotor blade in torsion and flapping. This will be readily apparent from a description of a preferred embodiment in conjunction with the accompanying figures of the drawing.

FIG. 1 is a perspective view of a flexbeam and rotor blade.

FIG. 2 is a cross-sectional view of the flexbeam of FIG. 1.

FIG. 3 is a top view of a deflected flexbeam.

FIG. 4 is a cross-sectional view of the flexbeam of FIG. 3.

FIG. 5 is a side view of another damper installation of the invention.

PREFERRED EMBODIMENT

Referring now to FIG. 1, a rotor blade 2, is shown with its root end 4 attached to outboard ends 6 and 8 of flexbeams 10 and 12. The flexbeams are back-to-back C-beams as shown in FIG. 1. The inboard ends 14 and 16 of flexbeams 10 and 12 are attached to a rotor hub 18 as is apparent in FIG. 3. Not shown in FIG. 3, but visible in FIGS. 1, 2, and 4, is a torque pitch tube 19 which is centered between the two flexbeams so that a torsional force applied thereto is communicated to rotor blade 2.

FIGS. 1 and 3 thus depict a helicopter rotor blade assembly which is resilient in three axis and therefore subject to vibrational forces and lead-lag motion which require blade damping. As indicated previously, in the case of a hingeless helicopter rotor blade assembly, the intervening flexbeams, which may be as long as twenty per cent of the blade length, impose limitations on rotor blade damping means. An efficient and economical damping means which can be utilized in a flexbeam rotor system is provided herein, and it will now be described.

The blade damping means of the invention can best be seen in FIG. 1. These dampers 22 are located along the flexbeam feathering axis where the curvature due to lead-lag flexing is at a maximum. The location does, of course, depend upon the particular flexbeam design.

In essence the damping means of the invention includes flat strong damper beams 20 disposed adjacent the C sections of flexbeams 10 and 12. The spanwise centers of damper beams 20 are located at the span location of the flexbeams where edgewise curvature will be greatest. Preferably the damper beams will be fabricated of a light metal, alloy, or composite plastic material.

Referring to FIG. 2, it will be seen that damper beam 20 supporting yokes 23, usually a composite material, are mounted on flexbeams 10 and 12. As shown in FIG. 1, three such bodies or yokes, are placed against each of the flexbeams to support the damper beam. They are anchored to the flexbeam by bands 24, belts, straps, bonding agents, plastic skins or housings. Damper beam supporting yokes 23 are provided with central cavities 26 through which damper beams 20 pass as shown in FIG. 1.

On damper beams in each cavity 26, between the cavity wall and the damper beam sections which are within the cavity, elastomeric shear pads 30 (FIG. 2) are mounted. One surface 32 of each shear pad is bonded to the inside cavity wall which it abuts. The other shear pad surface 34 is bonded to the damper beam section it is mounted on, best seen in FIG. 2.

Having described the damping means of the invention, we shall now consider its operation in preventing a resonance of the frequency of the rotor lag motion. FIG. 3 shows a rotor blade 2 in the lag mode. It will be noted that this lag motion causes a deflection of flexbeams 10 and 12. Since damper beams 20 are rigid in the blade flap plane, they do not bend, but remain stiff as shown in FIG. 3. It has been pointed out that by a band 24 or otherwise, damper beam supporting yoke 23 is firmly attached to its adjacent flexbeam. Hence it moves with the flexbeam as can be seen. This movement induces relative motion at the interface between the supporting yoke 23 and the damper beam 20. Since the shear pads 30 are bonded to both a cavity wall and the damper beam in this interface, flexing or bending of the flexbeam causes shear pads 30, shown in FIG. 4, results in damping out translatory blade motion by dissipation of energy as heat.

It will be appreciated that in the lead mode the shearing effect is the same, except that pads 30 will be sheared in a direction opposite that shown in FIG. 4 to effect blade damping. It will also be appreciated that in the blade flapping mode there is no blade damping. Each damper beam 20 is rectangular in cross section. Since in the direction of its narrow dimension it is flexible, the damper beam bends with the flexbeam, and there is no relative motion between the damper beam supporting yoke and the damper beam.

In the light of the teachings of this invention variations and modifications will occur to those skilled in the art. Thus, the damping effect can be increased by the use of more than one damper beam adjacent the flexbeam. One such embodiment is shown in FIG. 5, which is an edge or side view of a rotor blade. In this modification the same three supporting yokes 23 and shear pads 30 are employed, but two rigid damper beams 20 are held by the damper beam supporting yokes. Increasing the number of damper beams increases the number of shear pads, and, consequently, increases the resulting damping. Hence one variation of the invention involves utilizing more than one damper beam per flexbeam.

FIG. 5 also show another embodiment of the invention. The two damper beams could be straight bars such as the damper beams shown in FIG. 1. In an edge view such as FIG. 5, they would appear parallel from tip to tip. In the embodiment shown in FIG. 5 the damper beams 20 are bent inwardly toward each other at 21 so that they are closer together between the damper beam supporting yokes 23. This introduces a degree of flexibility enhancing blade flapping.

Considering other variations, since composites, that is filled or reinforced metals or plastics, are well known, any of the alloys, polybutylenes, polyepoxides, polyesters, or polyphenylene oxides can be selected for the composite support member. Likewise as shear pads any of the know elastomers, such as the polyamides, polyamide-imides, polypropylenes, polyurethanes, and polyvinyl copolymers can be chosen. Viscoelastic and viscohydraulic materials can be utilized as elastomers as well. Such ramifications are deemed to be within the scope of this invention.

What is claimed is:

1. Means for damping lead/lag rotor blade motion in a helicopter rotor system of the type having a central hub, radial flexbeams attached at their root ends to the hub, and rotor blades attached at their root ends to the outboard ends of the flexbeams, comprising: a damper beam substantially rectangular in cross section so that it is flexible in the direction of its narrow cross-sectional dimension and rigid in the direction of its wide cross-sectional dimension to permit the damper beam to flex in the narrow cross-sectional mode to allow blade flapping; a plurality of damper beam supporting yokes attached to the flexbeam, the yokes being adapted to hold the damper beam, unconnected to the central hub and unconnected to the rotor blade, adjacent to only a section of the flexbeam, that section of the flexbeam being that where its feathering axis curvature due to lead/lag flexing is at a maximum, the yokes being adapted to secure the damper beam so that it is rigid in the lead/lag mode and flexible in the blade flapping mode, the yokes being adapted to move with the flexbeam; a longitudinal cavity through each damper beam supporting yoke to support the damper beam in the flexbeam plane; elastomeric shear pads mounted on damper beam sections within each cavity; bonding means, binding one side of the shear pad to the damper beam, and the other side to a cavity wall so that when a lead/lag motion causes deflection of the flexbeam, and the rigid damper beam does not bend, the resulting relative motion between the two causes the shear pads to deform in a shear mode; the number of shear pads being such that shearing action damps the flexbeam lead/lag motion without additional damping means.

2. The damping means of claim 1 wherein the damper beam is a composite plastic bar, and there are three composite plastic yokes.

3. The damping means of claim 1 wherein there are multiiple damper beams per flexbeam, each passing through the same yoke.

4. The damping means of claim 3 wherein the multiple damper beams are bent so that they are closer together between yokes.

* * * * *